Jan. 21, 1964  H. R. CROWTHER  3,118,479
SELF LOCKING FASTENER HAVING DEFORMED THREADED PORTION
Filed Aug. 8, 1960
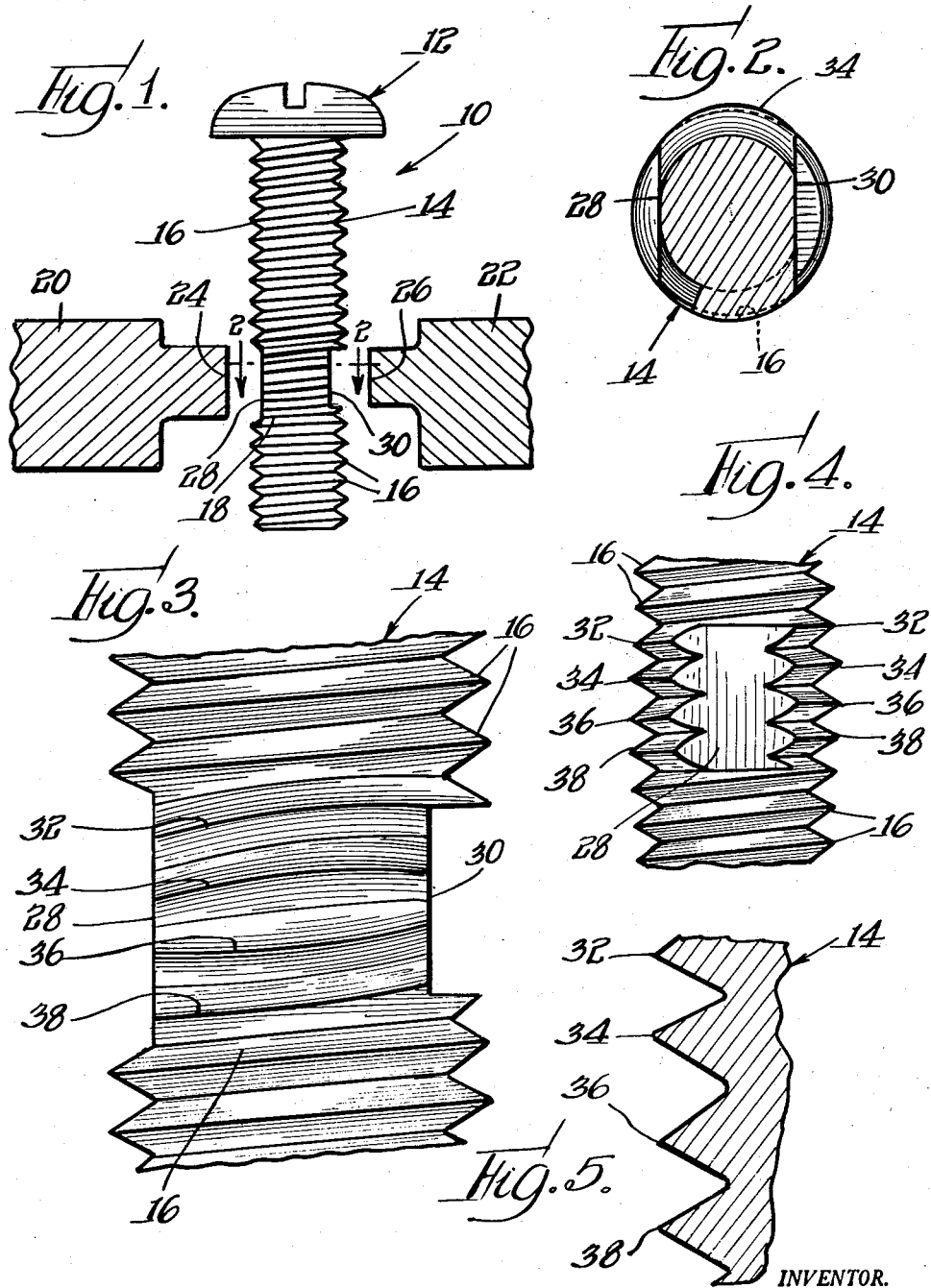
INVENTOR.
Henry Richard Crowther
BY
Olson & Trexler
Attys United States Patent Office 3,118,479
Patented Jan. 21, 1964

3,118,479
SELF LOCKING FASTENER HAVING DEFORMED
THREADED PORTION
Henry Richard Crowther, Crystal Lake, Ill., assignor to
Illinois Tool Works Inc., a corporation of Delaware
Filed Aug. 8, 1960, Ser. No. 48,301
3 Claims. (Cl. 151—22)

The present invention relates to a novel threaded fastener member such as a screw, and more particularly to a novel self-locking fastener member having a threaded shank.

An important object of the present invention is to provide a novel fastener having a threaded shank formed with means for resisting unauthorized retrograde rotation or loosening of the fastener, which fastener may be repeatedly tightened and loosened without losing its ability to provide effective locking action.

Another object of the present invention is to provide a novel self-locking fastener member having a threaded shank formed with locking means in a manner which facilitates high speed economical production thereof.

Still another important object of the present invention is to provide a novel fastener having a threaded shank with locking means formed thereon in a manner which enables highly effective locking action to be obtained without need for maintaining close tolerances between the threaded shank and an internally threaded hole in a complementary member with which the fastener is to be assembled.

A more specific object of the present invention is to provide a novel fastener of the above described type which is constructed so that the pitch and configuration of predetermined portions of helical thread convolutions on the shank may be readily changed from that of the remainder of the thread convolutions for providing effective and improved locking action.

Other objects and advantages of the present invention will become apparent from the following description and the accompanying drawings wherein:

FIG. 1 is an elevational view partially in section showing a screw member incorporating features of the present invention and tool which may be used for forming the screw member;

FIG. 2 is an enlarged sectional view taken along line 2—2 in FIG. 1;

FIG. 3 is an enlarged fragmentary elevational view showing the manner in whcih a portion of the threaded screw shank is formed to provide locking means in greater detail;

FIG. 4 is an enlarged fragmentary elevational view of a portion of the screw shank turned 90° from the position shown in FIG. 1; and FIG. 5 is an enlarged fragmentary sectional view taken along line 5—5 in FIG. 1.

Referring now more specifically to the drawings wherein like parts are designated by the same numerals throughout the various figures, a screw member 10 is shown in its entirety in FIG. 1, which screw member is formed in accordance with the present invention. However, it is to be understood that features of the present invention may be incorporated in any other fastening device utilizing a threaded shank which is adapted to be assembled with a complementary internally threaded member. In the embodiment shown, the screw member 10 comprises a head portion 12 from which an axially extending shank 14 projects.

The shank 14 which is preferably of hardened steel when the screw is finished, includes a plurality of integral helical thread convolutions 16 having predetermined root and crest diameters as well as a predetermined pitch and lead. In accordance with the present invention a portion 18 of the shank is formed so as to provide locking means described more in detail below. In the embodiment shown in FIG. 1, the locking portion 18 of the shank is disposed intermediate the shank ends, but it is to be recognized that the portion 18 may be located at substantially any desired point along the length of the shank.

In order to form the locking portion 18 of the shank, generally opposite circumferentially and axially limited areas of the shank are pinched and swaged by means of suitable tools 20 and 22. This operation may be carried out by utilizing an automatic high speed apparatus frequently referred to as a pinch pointer, which apparatus is well known and need not be shown or described. It is to be noted that in accordance with a feature of the present invention the area of the shank engageable end 24 of the tool 20 is greater than the area of the corresponding end 26 of the tool 22. Thus when the shank is pinched by means of the tools 20 and 22, one circumferentially and axially limited area of the shank is provided with a substantially flat surface 28 by the end portion 24 of the tool 20 and an opposite side of the shank is provided with a generally flat surface 30 having a smaller area by the end portion 26 of the tool 22.

As shown best in FIGS. 2, 3 and 4 portions of a plurality of the thread convolutions on the shank are swaged inwardly to provide the surfaces 28 and 30 which are preferably located so as to avoid undue interference with crests of a complementary internally threaded member such as a nut, not shown, with which the screw member is to be assembled. Preferably the surface 28 is swaged inwardly at least substantially as far as the roots of the thread convolutions 16. As shown best in FIG. 2 the surface 30 is swaged inwardly even farther than the surface 28. The increased depth of the surface 30 may be accomplished by utilizing the relatively small tool end 26 described above.

As shown in the drawings segments 32, 34, 36 and 38 of the original thread convolutions 16 extend along opposite sides of the shank between the flattened surfaces 28 and 30. These thread segments provide the principal locking means of the device of the present invention. Referring specifically to FIG. 3 is is seen that the thread convolutions 16 are formed with a predetermined pitch and lead angle which may be in accordance with recognized standards or, of course, determined in any other way if desired.

It is to be noted that in accordance with an important feature of the present invention, the thread segments 32, 34, 36 and 38 at opposite sides of the shank are formed by the swaging action which produces the substantitally flat surfaces 28 and 30 so that the pitch and lead angle of the thread segments differs from the pitch of the remaining convolutions 16. Furthermore, as shown best in FIG. 3, the pitch and lead angle of each of the thread segments 32-38 varies throughout its length with the pitch of portions of the thread segments being increased and the pitch of other portions of the thread segments being decreased. For example, the ends of the intermediate thread segments 34 and 36 adjacent the surface 28 are relatively close together as compared with mid-portions of the segments which arrangement is acomplished by increasing the lead angle of the segment 34 from the center of the segment toward the surface 28 and decreasing the lead angle of the corresponding portion of the segment 36. Conversely the lead angle of the opposite end portions of the segments 34 and 36 are respectively progressively decreased and increased so that the ends of these segments at surface 30 are also relatively close together. In fact it is to be noted that the change in lead angles and pitch of these last mentioned end portions of the segments is even more pronounced and the terminal ends thereof at the surface 30 are even closer together than their ends at the surface 28 for further enhancing the locking action which will be described more in detail below. This specific formation results from the above described swaging action whereby the smaller faced tool 26 forms the screw shank to a greater depth than the tool end 24. As a result of the swaging action the sides of the shank portion 18 between the flat surfaces 28 and 30 are bulged outwardly as shown in a somewhat exaggerated manner in FIG. 4, which bulging action helps to change the pitch of the thread segments 32–38 by causing midportions of these thread segments to be spread apart. At the same time, the diameter of the shank is reduced at the points where the ends of the thread segments 32–38 intersect the faces 28 and 30 so as to promote the pinching of the ends of the thread segments 32–38 together as described above.

The changing pitch of the thread segments 32–38 minimizes the need for holding close tolerances between the screw shank and the hole of the complementary nut or other member to which the screw is to be applied. However, it is desired to hold the bulging of the thread segments and shank to a small value. It has been found that the bulging of the screw shank may be held to the desired value while a more significant change in the pitch of the thread segments may be obtained by forming the surfaces 28 and 30 in a manner described above so that one of them is deeper than the other.

The screw member 12 may be applied to a nut or any other internally threaded member, not shown, in the usual way. A substantial interference between the flanks of the thread segments and the threads of the complementary member will occur as a result of the variations in the pitch and lead angles of the thread segments 32–38, which interference provides an effective locking action or resistance to unauthorized retrograde rotation. In addition to the locking action provided by the frictional interference between the thread segments and the workpiece, it is believed that a further locking action is obtained as a result of a cold working or deforming of the workpiece threads by the hardened thread segments 32–38. More specifically, as the screw member 12 is applied to the workpiece, the thread segments 32–38 tend to end or deform the threads of the complementary workpiece, which threads are subsequently straightened upon engagement with the standard thread convolutions 16 of the screw. It is further believed that this working and subsequent straightening of these threads enhances the ability of the screw member 10 to provide improved locking action after repeated assembly with and removal from the complementary internally threaded member.

While the preferred embodiment of the present invention has been shown and described herein, it is obvious that many structural details may be changed without departing from the spirit and scope of the appended claims.

The invention is claimed as follows:

1. A fastener member, comprising an elongated shank, a plurality of helical thread convolutions on said shank and having predetermined root and crest diameters and a predetermined pitch and lead angle, a pair of generally oppositely disposed axially and circumferentially limited areas of said shank and a portion of said thread convolutions thereon being swaged and substantially flattened inwardly at least substantially to the roots of said thread convolutions, another portion of said helical thread convolutions located between and intersecting said swaged areas having a pitch which varies from said predetermined pitch for promoting interference between said last mentioned portion of thread convolutions and an internally threaded complementary member when the fastening member is assembled with the complementary member, said last mentioned portion of said threads including segments of at least two thread convolutions, one of said last mentioned segments increasing in lead angle toward one end thereof and decreasing in lead angle toward the opposite end thereof, and the other of said last mentioned segments decreasing in lead angle toward an end thereof adjacent said one end of said one segment and increasing in lead angle toward and end thereof adjacent said opposite end of one segment.

2. A fastener member, as defined in claim 1, wherein one of said areas is swaged inwardly radially more than the other of said swaged areas, ends of said thread segments intersecting said one area varying in pitch more than opposite ends of said segments.

3. A fastener, as defined in claim 1, wherein sides of said shank between said swaged areas and said last mentioned thread portions thereon are slightly bulged.

References Cited in the file of this patent

UNITED STATES PATENTS

| | | |
|---|---|---|
| 278,230 | Fairlamb | May 22, 1883 |
| 1,476,455 | Marye | Dec. 4, 1923 |
| 2,177,004 | Purtell | Oct. 24, 1939 |
| 2,349,593 | Hosking | May 23, 1944 |
| 2,414,870 | Harding | Jan. 28, 1947 |
| 2,637,361 | Nagel | May 5, 1953 |